(12) United States Patent
Kurasawa et al.

(10) Patent No.: US 7,801,026 B2
(45) Date of Patent: Sep. 21, 2010

(54) VIRTUALIZATION SWITCH AND METHOD FOR CONTROLLING A VIRTUALIZATION SWITCH

(75) Inventors: Yusuke Kurasawa, Kawasaki (JP); Jun Takeuchi, Kawasaki (JP); Atsushi Shinohara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 140 days.

(21) Appl. No.: 12/260,430

(22) Filed: Oct. 29, 2008

(65) Prior Publication Data

US 2009/0113234 A1 Apr. 30, 2009

(30) Foreign Application Priority Data

Oct. 30, 2007 (JP) .............................. 2007-281166

(51) Int. Cl.
*H04L 12/26* (2006.01)
*G06F 15/173* (2006.01)
(52) U.S. Cl. ..................... 370/217; 370/221; 370/242; 709/223
(58) Field of Classification Search ......... 370/216–226, 370/235–238, 241–252; 709/208–211, 223–226
See application file for complete search history.

(56) References Cited

U.S. PATENT DOCUMENTS

| 6,633,538 | B1 * | 10/2003 | Tanaka et al. | 370/222 |
| 7,284,020 | B2 * | 10/2007 | Shitomi et al. | 711/202 |
| 7,287,116 | B2 * | 10/2007 | Iwami et al. | 711/6 |
| 7,406,622 | B2 * | 7/2008 | Yamamoto et al. | 714/6 |
| 7,565,568 | B1 * | 7/2009 | Kumar et al. | 714/5 |
| 7,669,032 | B2 * | 2/2010 | Karr et al. | 711/203 |

| 2005/0055428 | A1 | 3/2005 | Terai |
| 2007/0016681 | A1 | 1/2007 | Suzuki |
| 2007/0171815 | A1 | 7/2007 | Takeuchi |

FOREIGN PATENT DOCUMENTS

| JP | 2003-44421 | 2/2003 |
| JP | 2003-256276 | 9/2003 |
| JP | 2005-507201 | 3/2005 |
| JP | 2007-26089 | 2/2007 |
| JP | 2007-172172 | 7/2007 |
| WO | 03/036501 | 5/2003 |
| WO | 03/085894 | 10/2003 |

OTHER PUBLICATIONS

Japanese Office Action JP-OA-091027 dated Oct. 27, 2009 for corresponding Japanese Patent Application.

* cited by examiner

*Primary Examiner*—Tri H Phan
(74) *Attorney, Agent, or Firm*—Staas & Halsey LLP

(57) ABSTRACT

A virtualization switch includes first communication line connection terminals which can be connected to a host computer, a physical storage apparatus or a plurality of physical storage apparatuses, and another virtualization switch, a second communication line connection terminal which can be connected to a single line concentrator or a plurality of line concentrators connected to a manager computer by a second communication line a storage virtualization unit, a first communication unit which can communicate with an other virtualization switch through a first communication line, second communication unit which can communicate with the other virtualization switch through an second communication line, second communication line monitor unit which test communication between the virtualization switch, and abnormal state coping unit which executes a closing process and causes the first communication unit to output a failover designation instruction.

10 Claims, 8 Drawing Sheets

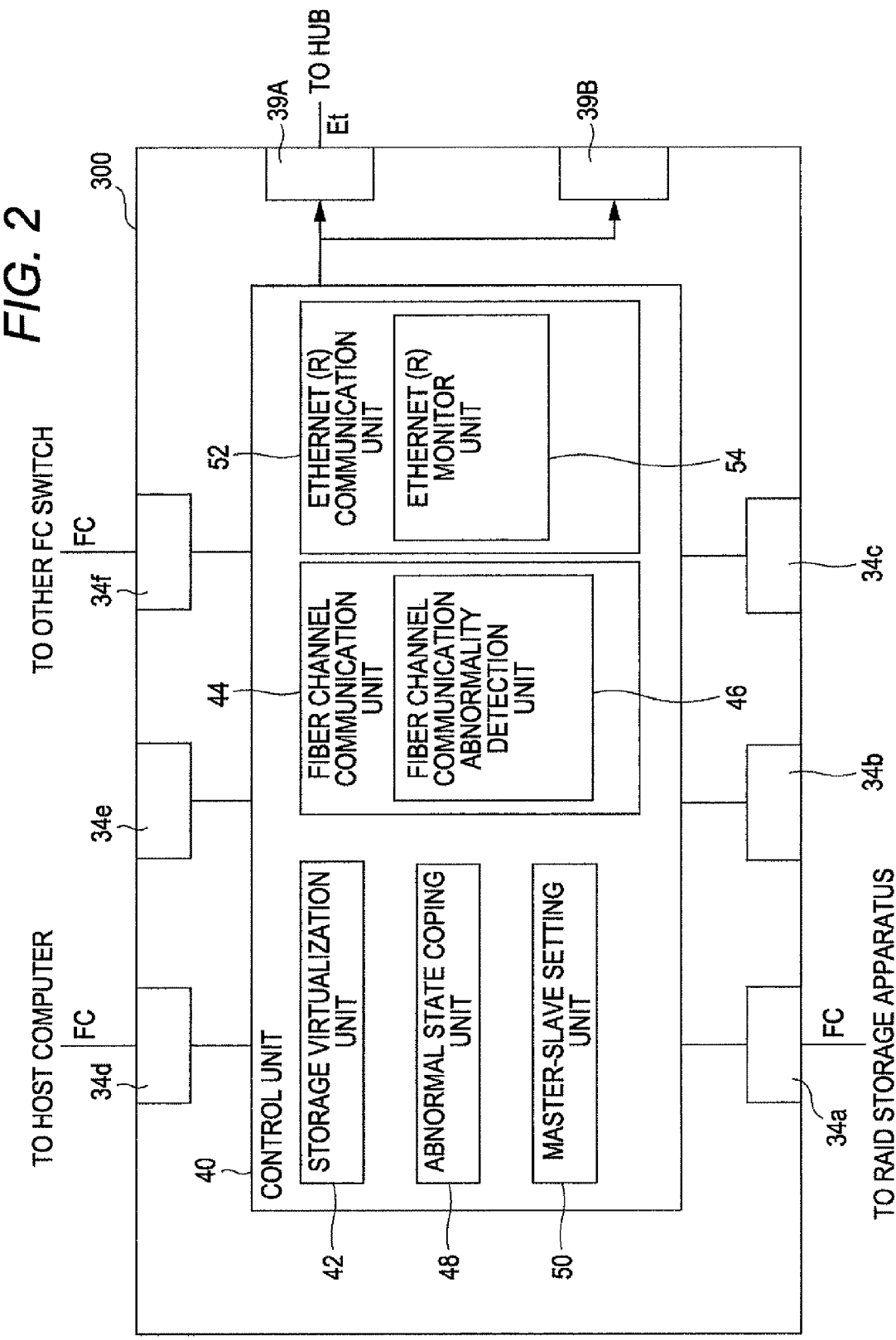

FIG. 3

| PATTERN | MASTER | | | SLAVE | | |
|---|---|---|---|---|---|---|
| | ETHERNET (R) | FC COMMUNICATION | PROCESS | ETHERNET (R) | FC COMMUNICATION | PROCESS |
| 1 | NORMAL | NORMAL | Failover | NORMAL | NORMAL | CLOSED |
| 2 | NORMAL | NORMAL | Failover | ABNORMAL | NORMAL | CLOSED |
| 3 | NORMAL | ABNORMAL | Failover | NORMAL | ABNORMAL | Failover |
| 4 | NORMAL | ABNORMAL | Failover | ABNORMAL | ABNORMAL | CLOSED |
| 5 | ABNORMAL | NORMAL | CLOSED | NORMAL | NORMAL | Failover |
| 6 | ABNORMAL | NORMAL | Failover | ABNORMAL | NORMAL | CLOSED |
| 7 | ABNORMAL | ABNORMAL | CLOSED | NORMAL | ABNORMAL | Failover |
| 8 | ABNORMAL | ABNORMAL | CLOSED | ABNORMAL | ABNORMAL | CLOSED |

VIRTUALIZATION SWITCH AND METHOD FOR CONTROLLING A VIRTUALIZATION SWITCH

CROSS-REFERENCE TO RELATED APPLICATIONS

This application is related to and claims priority to Japanese patent application no. 2007-281166 filed on Oct. 30, 2007 in the Japan Patent Office, the entire contents of which are incorporated by reference herein.

BACKGROUND

1. Field

The embodiments discussed herein are related to a virtualization switch and a method for controlling a virtualization switch.

2. Description of the Related Art

In a computer system using a plurality of storage apparatuses, virtualization of a storage can cause a host computer to recognize a storage area obtained by combining storage areas of a plurality of physical storage apparatuses as a virtual storage apparatus.

For example, as shown in FIG. 6, a plurality of host computers (node apparatuses) 1 and a plurality of physical storage apparatuses 2 are connected to each other by fibre channels through a fibre channel switch (network switch) 3, and some or all the storage areas in the plurality of physical storage apparatuses 2 are combined to each other by a network processor 4 of the fibre channel switch 3 to configure an apparatus as a virtual storage apparatus (virtual sharing disk) 5. A computer system can provide the virtual storage apparatus 5 to the host computers 1 such that the host computers 1 can access the virtual storage apparatus 5 is known (for example, see Japanese Patent Application Laid-Open No. 2003-44421).

According to the virtualization of the storage by the fibre channel switch, a user can freely structure a virtual storage apparatus suitable for a host computer. The host computer accesses the virtual storage apparatus to make it possible to use a physical storage apparatus without regarding storage capacities, connection conformations, and the like of the physical storage apparatuses.

Furthermore, in the virtualization of the storage using the fibre channel switch, a plurality of fibre channel switches are multiplexed to set redundant paths to provide a configuration which improves reliability (for example, see Japanese Patent Application Laid-Open No. 2007-172172).

As illustrated in FIG. 7 a computer system can have a configuration in which a plurality of fibre channel switches are multiplexed to set redundant paths.

In FIG. 7, one host computer 11 is connected to two fibre channel switches 10a and 10b by a fibre channel (FC).

The two fibre channel switches 10a and 10b are connected to a RAID (Redundant Arrays of Inexpensive Disks) storage apparatus 14 by a fibre channel (FC). As the RAID storage apparatus 14, a plurality of physical storage apparatus are virtually configured as one storage apparatus.

The two fibre channel switches 10a and 10b are connected to two hubs 12a and 12b by an Ethernet (R) serving as an example of a LAN communication standard, respectively.

Furthermore, the hubs 12a and 12b are connected to a manager computer 18 by an Ethernet Et, respectively. The manager computer 18 executes management such that virtual volumes or the like in the fibre channel switches 10a and 10b are set through the hubs 12a and 12b.

The two fibre channel switches 10a and 10b are connected not only by a connection by the Ethernet through the hubs 12a and 12b but also by a fibre channel.

The fibre channel switches 10a and 10b cause the host computer 11 to recognize virtual storage apparatuses having the same configuration. The host computer 11 can similarly access the virtual storage apparatus through any one of the two fibre channel switches 10a and 10b.

When the redundant system configuration is employed, even though, for example, a problem of breakdown of any one of the fibre channel switches 10a and 10b is posed, a system operation can be continued. Resistance to system failure can be improved.

A countermeasure against occurrence of a failure in the system will be described with reference to FIG. 8. An example in which only one hub is arranged to simplify the description will be described.

Any one of a plurality of fibre channel switches is set as a main switch (may be called a master switch as a general term in this specification), and the other is set as a sub-switch (may be called a slave switch as a general term). In this example, the two fibre channel switches are used, the left fibre channel and the right fibre channel being set as master and slave fibre channels, respectively.

In the fibre channel switches 10a and 10b, abnormal communication of an Ethernet can be detected through the Ethernet and the hub 12.

When any one of the fibre channel switches 10a and 10b detects abnormal communication of the Ethernet, the fibre channel switch 10a on the master side executes a failover process which takes over the process on the slave side. The fibre channel switch 10a on the master side outputs a closing designation command to perform a closing process to the fibre channel switch 10b on the slave side.

On the other hand, the fibre channel switch 10b on the slave side receives the closing designation command to close the access between the host computer 11 and the RAID storage apparatus 14.

Conventionally, in a computer system when the Ethernet communication between fibre channel switches is abnormal, the failover process is always executed on the master side, and the process is continued by the switch on one side.

However, when two Ethernets are connected between each of the fibre channel switches and the hub, even though the abnormal communication of the Ethernet can be detected, a specific line on which the abnormal communication occurs is not determined. Therefore, in the conventional configuration which always performs the failover process on the master side, even though a failure occurs in the Ethernet between the fibre channel switch on the master side and the hub, the slave side has been closed. For this reason, the system may go down disadvantageously.

SUMMARY

It is an aspect of the embodiments discussed herein to provide a virtualization switch including a plurality of first communication line connection terminals that can be connected to a host computer, a single physical storage apparatus or a plurality of physical storage apparatuses, and another virtualization switch by first communication lines, a second communication line connection terminal which can be connected to a single line concentrator or a plurality of line concentrators connected to a manager computer by a second communication line, and storage virtualization unit which causes the host computer to recognize a storage area obtained by combining some or all of storage areas of the single physical storage apparatus or the plurality of physical storage apparatuses as a virtual storage apparatus.

According to an exemplary embodiment a virtualization switch includes a first communication unit which can communicate with the other virtualization switch through the first communication line, second communication unit which can communicate with the other virtualization switch through the second communication line and the line concentrator, second communication line monitor unit which periodically performs test communication to check whether communication with the other virtualization switch can be performed by the second communication unit and which detects whether the second communication line on its own apparatus side between the virtualization switch and the line concentrator is abnormal when abnormal communication is detected during the test communication, and abnormal state coping unit which operates when the second communication line monitor unit detects the abnormal communication.

According to an exemplary embodiment, when a second communication line monitor unit detects abnormal communication with the other virtualization switch and detects that the abnormality is abnormality of the second communication line on its own apparatus side, the abnormal state coping unit executes a closing process which closes an access between the host computer and the physical storage apparatus through the virtualization switch and causes the first communication unit to output a failover designation instruction which causes the other virtualization switch to execute a failover process.

According to an exemplary embodiment, when a second communication line monitor unit detects abnormal communication with the other virtualization switch and detects that communication of the second communication line on its own apparatus side is normal, the abnormal state coping unit executes the failover process and causes the first communication unit to output a closing designation instruction which executes a closing process for closing an access between the host computer and the physical storage apparatus through the other virtualization switch.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 illustrates a configuration of a virtualization switch (fibre channel switch) according to an exemplary embodiment;

FIG. 3 illustrates a table when a second communication line (Ethernet communication) is abnormal in a computer system according to an exemplary embodiment;

DETAILED DESCRIPTION OF THE EMBODIMENTS

An exemplary embodiment for carrying out a virtualization switch and a computer system will be described below.

Figure 1:
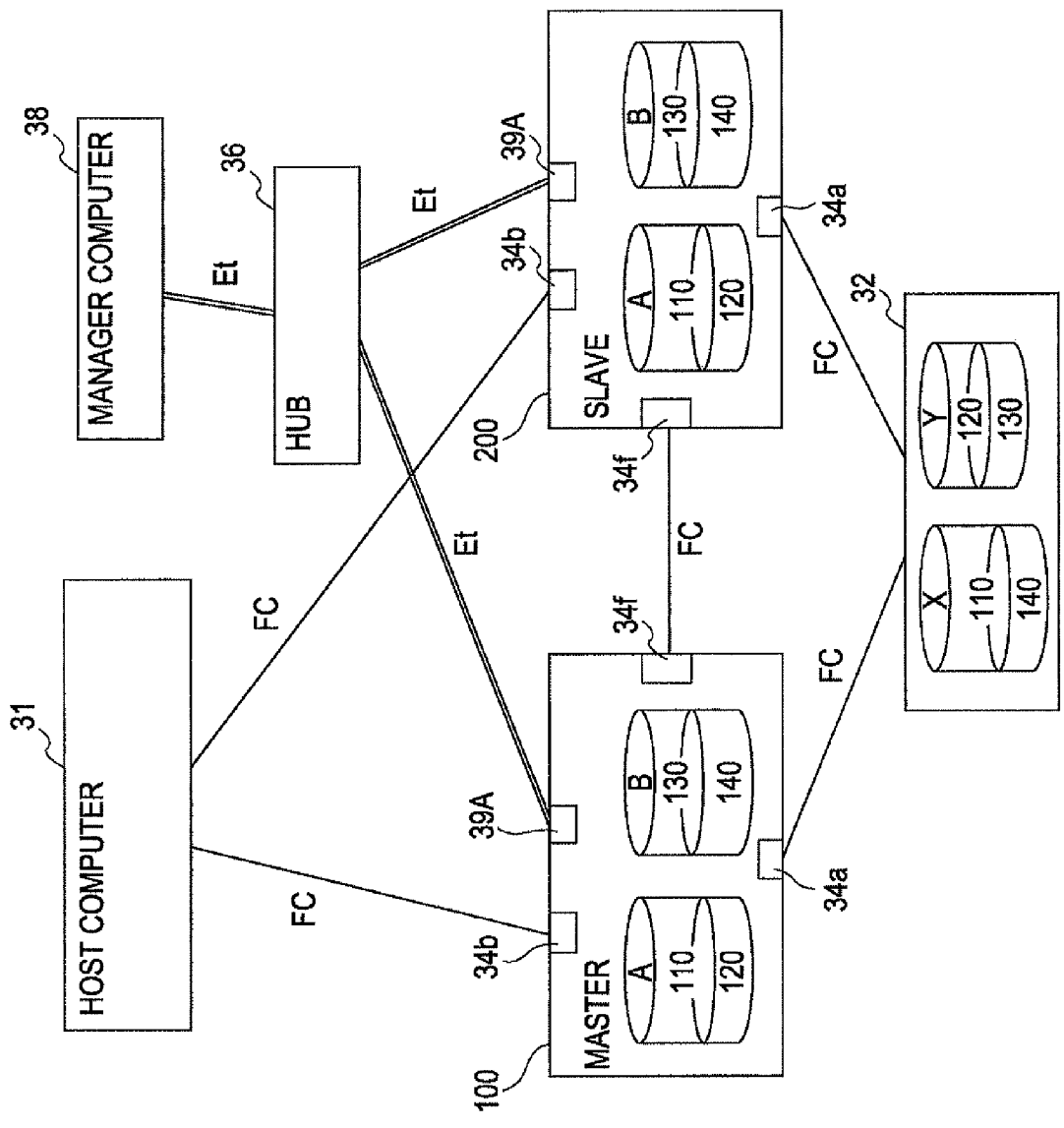
FIG. 1 illustrates a configuration of a computer system according to an exemplary embodiment.

FIG. 1 illustrates a configuration of a computer system according to an exemplary embodiment.

In a computer system 30, two fibre channel switches 100 and 200 are connected to one host computer 31 through fibre channels FC. The fibre channel switches 100 and 200 are connected to a RAID storage apparatus 32 including two physical storage apparatuses X and Y through the fibre channels FC, respectively.

The fibre channel switches 100 and 200 can cause the host computer to recognize virtual storage A and B having the same configurations. For this reason, the host computer 31 can similarly access the virtual storage A and B through any one of the two fibre channel switches 100 and 200.

In the embodiment, the fibre channel switches 100 and 200 combine a part 110 of a physical storage apparatus X and a part 120 of a physical storage apparatus Y to configure a virtual storage A. A part 130 of the physical storage apparatus Y and a part 140 of the physical storage apparatus X are combined to each other to configure a virtual storage B.

The fibre channel switches 100 and 200 provide the virtual storages A and B such that the host computer 31 connected thereto can access the virtual storages A and B.

The fibre channel switches are LAN-connected to a manager computer 38 through a hub 38. In this embodiment, the Ethernet can be exemplified as a LAN communication standard. The manager computer 38 executes management such that virtual volumes in the fibre channel switches 100 and 200 are set through the hub 36.

The manager computer 38 and the two fibre channel switches 100 and 200 are arranged through the hub 36 serving as a line concentrator such that the manager computer 38 and the fibre channel switches 100 and 200 can communicate with each other through the Ethernet Et.

Furthermore, the two fibre channel switches 100 and 200 are also directly connected to each other by the fibre channel FC, and can also communicate with each other by the fibre channel.

An exemplary embodiment of the fibre channel switches will be described below with reference to FIG. 2. FIG. 2 illustrates a configuration of the fibre channel switch 300 according to this embodiment. Since the other fibre channel switch has the same configuration as that of the fibre channel switch 300, the other fibre channel switch is omitted in FIG. 2.

The fibre channel switch 300 includes a plurality of fibre channel connection terminals 34a to 34f arranged to be connectable to the host computer 31, another fibre channel switch and the RAID storage apparatus 32 by the fibre channel.

Coaxial cables corresponding to the fibre channels or fibre channel cables including optical fiber cables can be connected to the fibre channel connection terminals 34a to 34f. The host computer 31, the other fibre channel switch, and the RAID storage apparatus 32 are connected to the fibre channel connection terminals 34a to 34f through the fibre channel cable.

The fibre channel switch 300 includes LAN connection terminals 39A to 39C which can be LAN-connected to the hub 36. As described above, according to the embodiment, the Ethernet is employed as a LAN communication standard. In the Ethernet, a cable for Ethernet such as a coaxial cable or a twist pair cable is generally employed. The LAN connection terminals 39A to 39C are arranged such that the cables for Ethernet can be connected thereto.

The fibre channel switch 300 has a control unit 40 including a CPU, another LSI, a memory, and the like. The control unit 40 executes a firmware program recorded on a ROM by the CPU or executes a function of the LSI to make it possible to realize storage virtualization unit 42, fibre channel communication unit 44, fibre channel communication abnormality detection unit 46, abnormal state coping unit 48, master-slave setting unit 50, Ethernet communication unit 52, and Ethernet monitor unit 54.

The storage virtualization unit 42, as shown in the example in FIG. 1 provides a storage area obtained by combining parts of the storage areas of the physical storage apparatuses X and Y connected through a fibre channel connection terminal 34a to the host computer 31 as the virtual storages A and B. The configurations of the virtual storage apparatuses obtained by the fibre channel switches are not limited to this example. Some or all of the storage areas of a large number of connected physical storage apparatuses are freely combined to each other to make it possible to configure virtual storages.

The storage virtualization unit 42 accesses a corresponding area of the physical storage apparatuses X and Y through a fibre channel connection terminal 32a based on access signals input from the host computer 31 to the virtual storages A and B through the fibre channel connection terminals 34a to 34f.

The fibre channel communication unit 44 has a function of performing communication with the other fibre channel switch connected by the fibre channel FC through the fibre channel connection terminals 34a to 34f.

The fibre channel communication abnormality detection unit 46 is arranged as one function of the fibre channel communication unit 44. In the embodiment, the fibre channel communication unit 44 mainly executes communication control with the other fibre channel switch. When there is no response for a predetermined period of time after some command is transmitted to the other fibre channel switch, the fibre channel communication unit 44 recognizes abnormality in the fibre channel communication line.

The Ethernet communication unit 52 has a function of communicating with another apparatus by an Ethernet which is popularized as an example of a LAN communication standard. In this case, the other apparatus includes the other fibre channel switch and the manager computer 38 connected through the hub 36, and the Ethernet communication unit 52 executes access control to these apparatuses.

The Ethernet communication unit 52 checks an idle state of a cable when data is transmitted to the other apparatus. This is because, if, during data transmission from the other party, data is also transmitted from this side, collision occurs, and the data may be erased.

The Ethernet monitor unit 54 is arranged as one function of the Ethernet communication unit 52. When access to the virtual storages A and B by the host computer 31 is interrupted, for example, when necessary communication with the other fibre channel switch does not occur, the Ethernet monitor unit 54 transmits dummy information to the other fibre channel switch to obtain a response from the fibre channel switch, so that it is always monitored whether Ethernet communication with the other fibre channel switch can be performed. The transmission of the dummy information is not limited to a specific one. However, for example, a configuration can be employed in which, when necessary communication is interrupted for one second or longer, the transmission is performed at 1-second intervals.

The Ethernet monitor unit 54 can detect whether an abnormal communication with the other fibre channel switch is abnormality in an Ethernet line of its own apparatus side from its own apparatus 300 to the hub 36. More specifically, after the Ethernet monitor unit 54 transmits the dummy information to the other fibre channel switch, when no response is returned, the dummy information is then transmitted to the hub 36. When the hub 36 responds to the transmission of the dummy information, the Ethernet monitor unit 54 determines that the Ethernet line on its own apparatus side is normal. When the hub 36 does not respond to the transmission of the dummy information, the Ethernet monitor unit 54 determines that the Ethernet line on its own apparatus side is abnormal.

The master-slave setting unit 50 has a function of setting a master-slave (master or slave) relationship to the other fibre channel switch.

The setting of the master-slave relationship in the master-slave setting unit 50 is performed such that master-slave information representing whether the fibre channel switch is master or slave with respect to the other fibre channel switch is stored in a nonvolatile memory in advance.

Accordingly, the master-slave information is written in the nonvolatile memory when the computer system is configured, whereby the master-slave relationship between the fibre channel switch 300 and the other fibre channel switch can be set in advance.

The abnormal state coping unit 48 operates when the Ethernet monitor unit 54 detects abnormality in Ethernet communication.

When the Ethernet monitor unit 54 detects that the communication with the other fibre channel switch is abnormal, the abnormal state coping unit 48 closes an access between the host computer 31 and the physical storage apparatuses X and Y in consideration of the status of the other fibre channel switch or executes a failover process.

In the exemplary embodiment, the abnormal state coping unit 48 performs different operations for the fibre channel switch set to be master and the fibre channel switch set to be slave, respectively.

The abnormal state coping unit 48 of the master fibre channel switch executes the failover process in which the process performed on the slave side is performed on the master side regardless of the state of the slave side when the Ethernet line on its own apparatus side from its own apparatus to the hub 36 is normal even though abnormal communication of the Ethernet is detected.

On the other hand, when the abnormal state coping unit 48 of the slave fibre channel switch receives a designation command from the master side, the abnormal state coping unit 48 performs the closing process or the failover process according to the designation. Only when there is no response from the master side, the abnormal state coping unit 48 performs the closing process or the failover process based on whether the Ethernet line on its own apparatus side from its own apparatus to the hub 36 is normal.

The closing process and the failover process of the abnormal state coping unit 48 will be described below.

The closing process is a process to close an access between the host computer 31 and the RAID storage apparatus 32 through either of the fibre channel switches.

For example, the fibre channel switch 300 outputs a busy signal, representing that the virtual storage apparatuses A and B are busy, to the host computer 31 through the fibre channel connection terminal 32d to which the host computer 31 is connected, so that the host computer is prevented from accessing the virtual storage apparatuses A and B. In this manner, since the host computer 31 cannot access the virtual storage apparatuses A and B through the fibre channel switch 300, the virtual storage apparatuses A and B are accessed through another path in which access busy does not occur, i.e., a path connected to the other fibre channel switch.

The failover process is a process is performed, when a failure occurs in any one of the fibre channel switches, by taking over the process and the data of the fibre channel switch in which the failure has occurred.

The fibre channel switch 300 and the other fibre channel switch are synchronized with each other with respect to data processing or the like while monitoring the states of the fibre channel switch 300 and the other fibre channel switch each other through the Ethernet. When any one of the fibre channel switches is closed, a take-over process such as data processing or the like can be reliably performed.

A specific coping method executed by the abnormal state coping unit 48 in an abnormal state of Ethernet communication will be further described below in detail with reference to FIGS. 3 to 5.

It is assumed that the fibre channel switch 300 to be described here is set to be master and that the other fibre channel switch is set to be slave.

FIG. 3 illustrates the presence/absence of abnormality of Ethernet communication of the fibre channel switches on the master side and the slave side and 8 exemplary patterns classified by the presence/absence of abnormality of the fibre channel communication.

Figure 4:
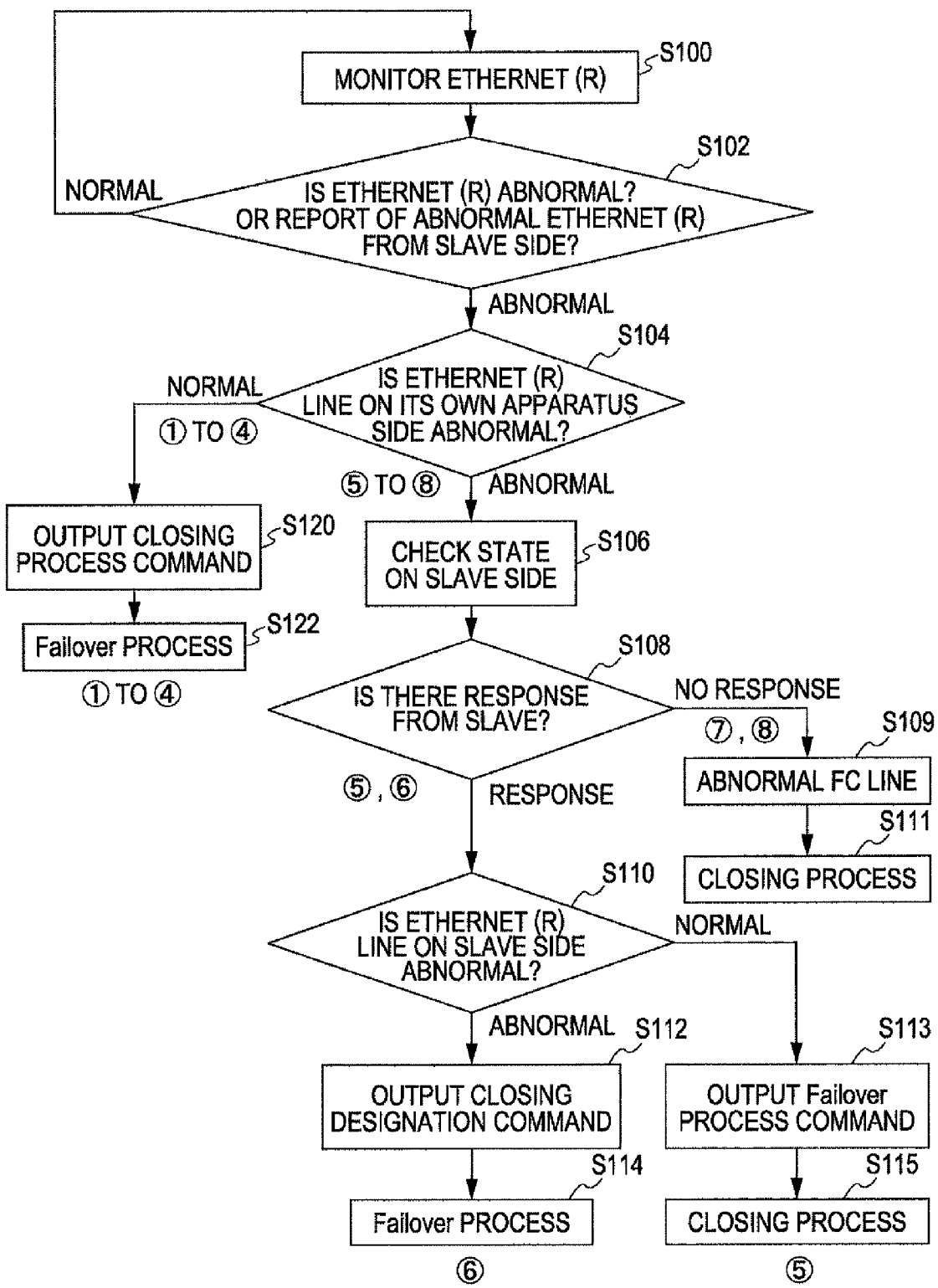
FIG. 4 illustrates for explaining a processing operation of a virtualization switch (fibre channel switch) on a master side according to an exemplary embodiment.
Figure 5:
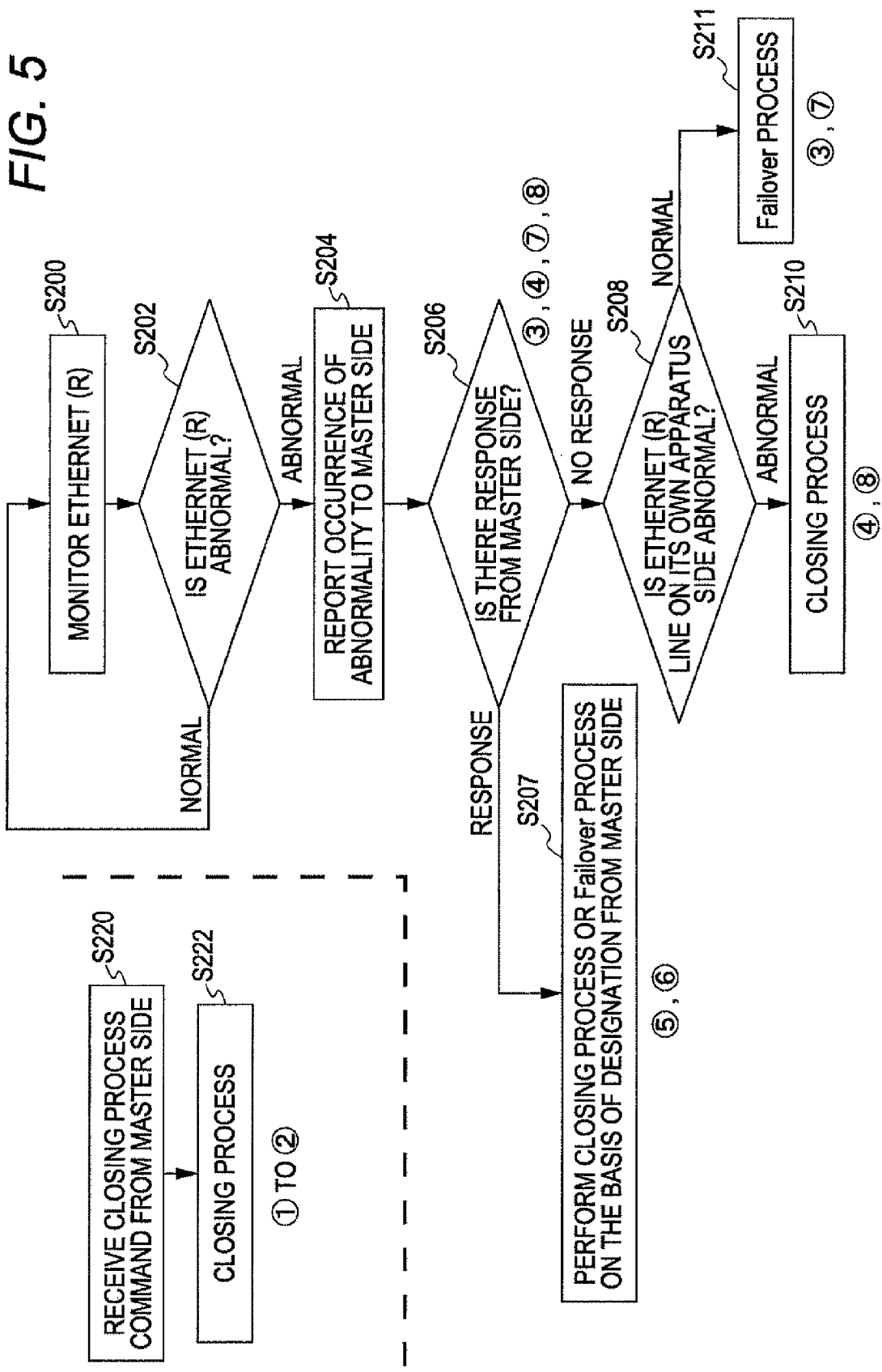
FIG. 5 illustrates for explaining a processing operation of a virtualization switch (fibre channel switch) on a slave side according to the present invention.
Figure 6:
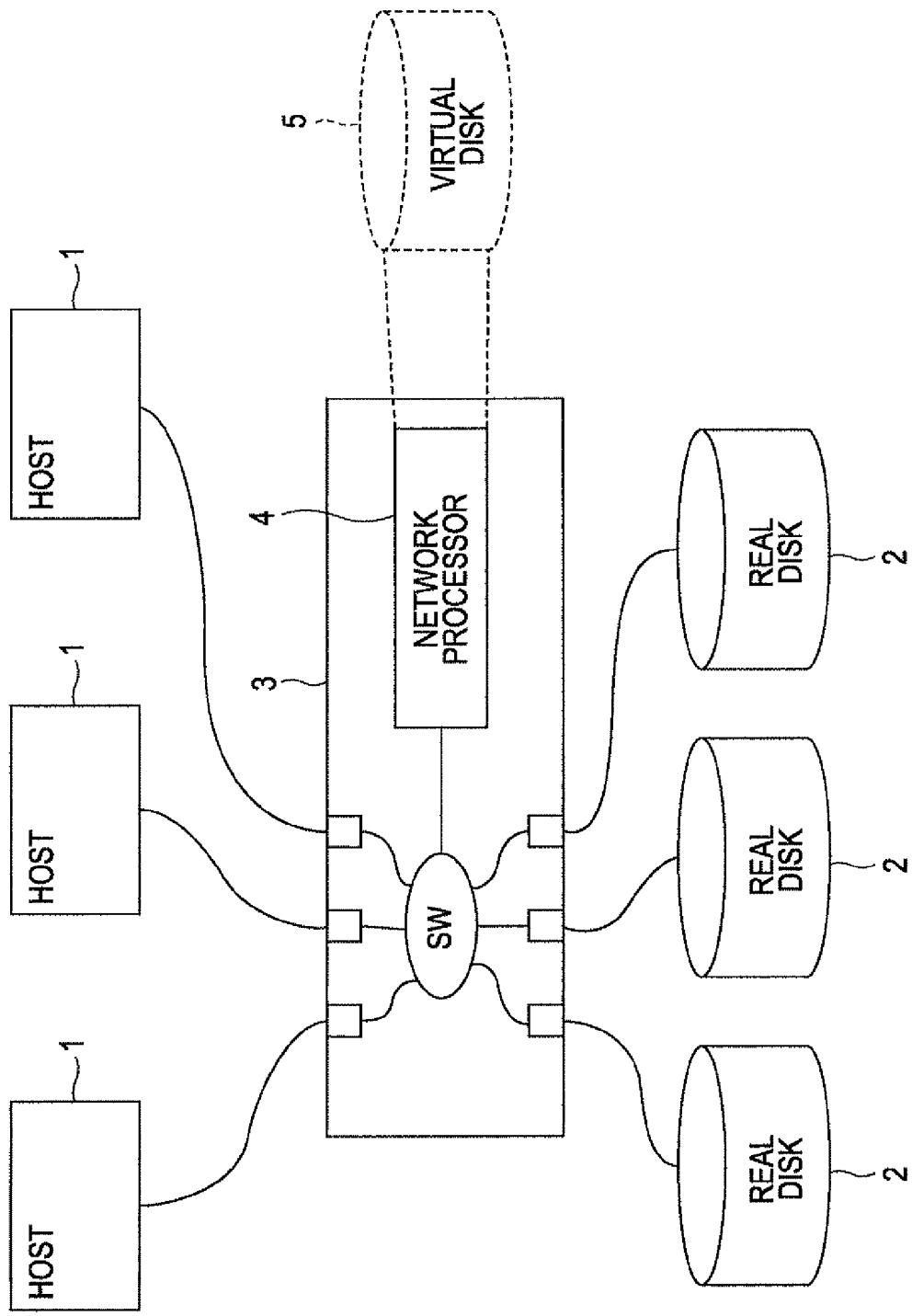
FIG. 6 illustrates a system configuration of a computer system using a conventional virtualization switch (fibre channel switch)
Figure 7:
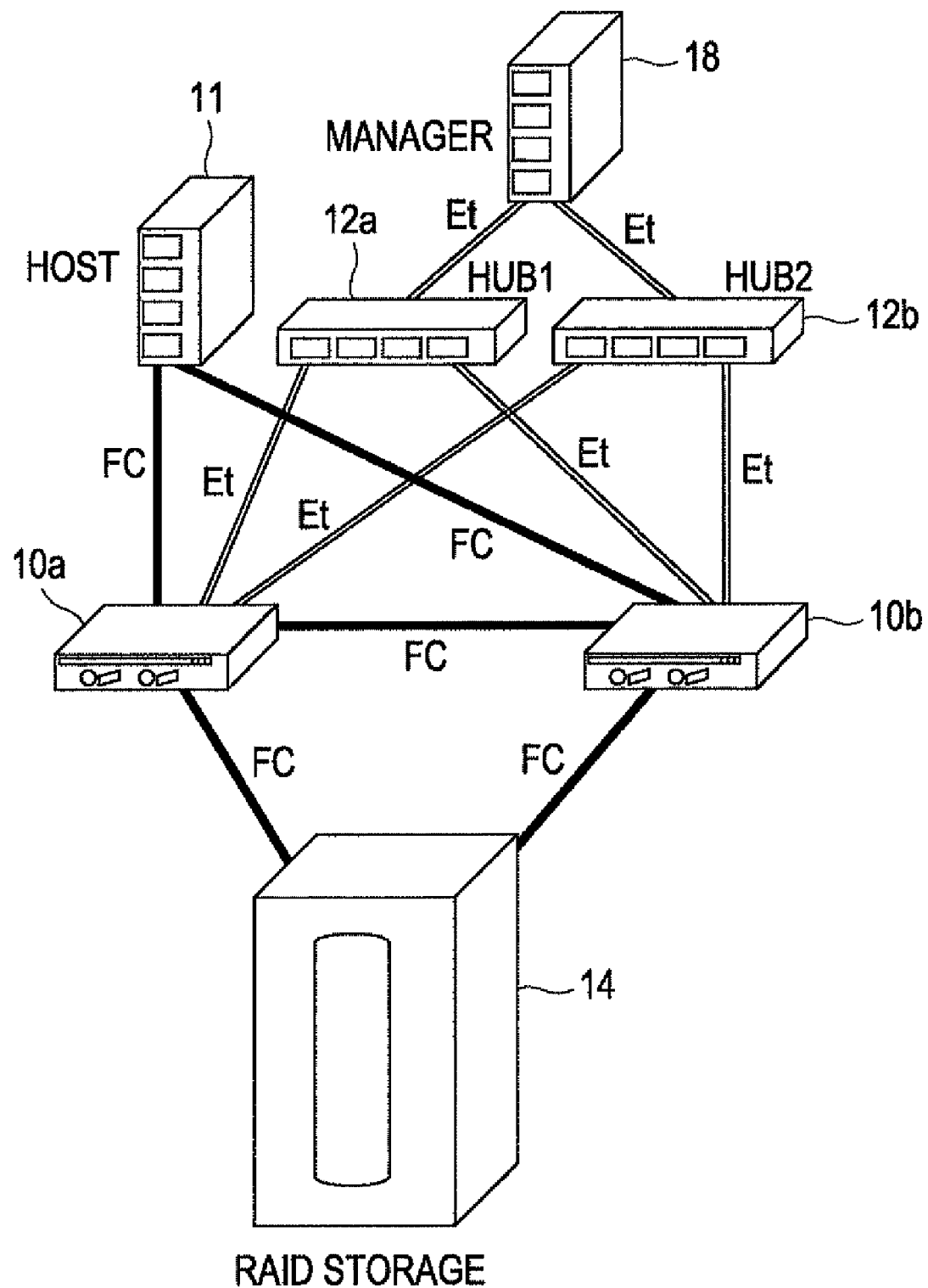
FIG. 7 illustrates a conventional example of a computer system in which a plurality of virtualization switches (fibre channel switches) are multiplexed to set redundant paths.
Figure 8:
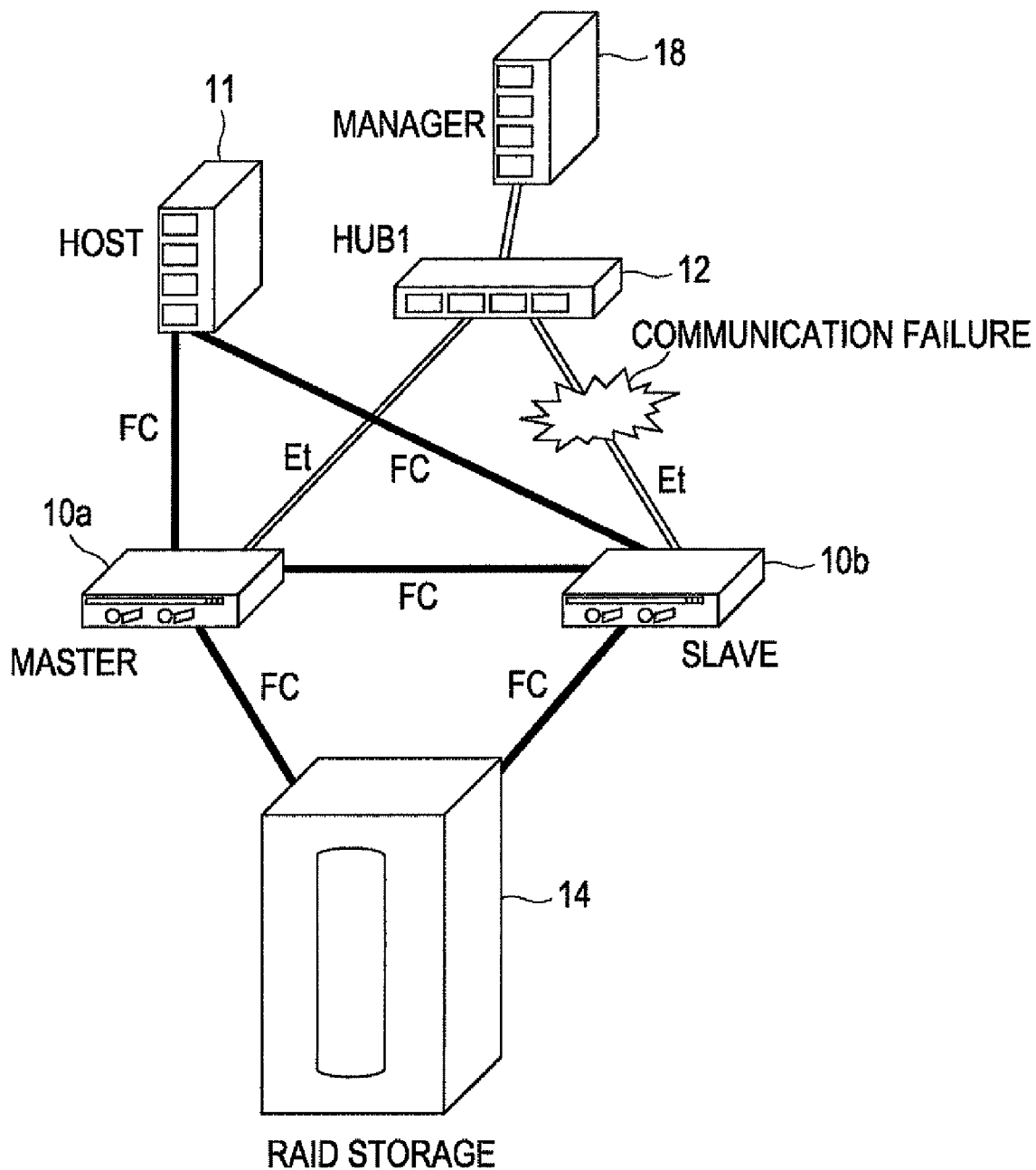
FIG. 8 illustrates a conventional example of a computer system showing a place where abnormality occurs in a second communication line (LAN communication).

FIG. 4 is a process flow chart of the fibre channel switch, e.g., fibre channel switch 300 set to be master, and FIG. 5 is a process flow chart of the other fibre channel switch set to be slave.

In the following description, the processes of the fibre channel switches in several exemplary patterns will be explained with reference to table in FIG. 3.

In the following explanations of the eight exemplary patterns, the following operations are commonly performed. That is, the Ethernet monitor unit 54 of the fibre channel switch on the master side detects abnormality of Ethernet communication, or the Ethernet monitor unit 54 of the fibre channel switch on the slave side detects abnormality of the Ethernet communication, and a report is transmitted to the fibre channel switch on the master side through fibre channel communication, so that the fibre channel switch on the master side recognizes abnormal Ethernet communication.

Therefore, an explanation of a part where the fibre channel switch on the master side recognizes abnormal Ethernet communication is omitted. An explanation after the recognition will be described below.

The Ethernet monitor unit 54 of the fibre channel switch on the master side determines that an Ethernet line on its own apparatus side is normal.

The abnormal state coping unit 48 of the fibre channel switch on the master side causes the fibre channel communication unit 44 to output a closing designation command to the fibre channel switch on the slave side.

The abnormal state coping unit 48 of the fibre channel switch on the master side executes a failover process which one-sides the process of the fibre channel switch on the slave side.

In the fibre channel switch on the slave side, the abnormal state coping unit 48 which receives the closing designation command closes an access between the host computer 31 and the RAID storage apparatus 32.

In exemplary pattern 1, the Ethernet line on the slave side is also normal, abnormal Ethernet communication is considered to be due to the internal influence of the hub 36. This state is considered to be rare.

In exemplary pattern 2, the Ethernet monitor unit 54 of the fibre channel switch on the master wide determines that the Ethernet line on its own apparatus side is normal.

The abnormal state coping unit 48 of the fibre channel switch on the master side causes the fibre channel communication unit 44 to output a closing designation command to the fibre channel switch on the slave side.

The abnormal state coping unit 48 on the master side executes a failover process which one-sides the process of the fibre channel switch on the slave side.

In the fibre channel switch on the slave side, the abnormal state coping unit 48 which receives the closing designation command closes an access between the host computer 31 and the RAID storage apparatus 32.

In exemplary pattern 3, the Ethernet monitor unit 54 of the fibre channel switch on the master wide determines that the Ethernet line on its own apparatus side is normal.

The abnormal state coping unit 48 of the fibre channel switch on the master side causes the fibre channel communication unit 44 to output a closing designation command to the fibre channel switch on the slave side.

The abnormal state coping unit 48 on the master side executes a failover process which one-sides the process of the fibre channel switch on the slave side.

In the exemplary pattern, since abnormality also occurs in fibre channel communication, the closing designation command does not reach the fibre channel switch on the slave side. Furthermore, even in the fibre channel switch on the slave side, abnormal Ethernet communication is detected. However, the report does not reach the fibre channel switch on the master side due to the abnormal fibre channel communication.

Since no designation is transmitted from the fibre channel switch on the master side, the abnormal state coping unit 48 of the fibre channel switch on the slave side causes the Ethernet monitor unit 54 to determine whether the Ethernet line on its own apparatus side is normal to detect that the Ethernet line is normal.

The abnormal state coping unit 48 of the fibre channel switch on the slave side executes a failover process which one-sides the process of the fibre channel switch on the master side.

In exemplary pattern 3, both the fibre channel switches perform the failover processes to set split brain states. However, this exemplary pattern is a very rare case in which abnormal communication in the hub 36 and abnormal communication of a fibre channel connecting both the fibre channel switches occur. The probability of occurrence of the case may be very low.

In exemplary pattern 4, the Ethernet monitor unit 54 of the fibre channel switch on the master side determines that the Ethernet line on its own apparatus side is normal.

The abnormal state coping unit 48 of the fibre channel switch on the master side causes the fibre channel communication unit 44 to output a closing designation command to the fibre channel switch on the slave side.

The abnormal state coping unit 48 of the fibre channel switch on the master side executes a failover process which one-sides the process of the fibre channel switch on the slave side.

In this exemplary pattern, since abnormality occurs in fibre channel communication, the closing designation command does not reach the fibre channel switch on the slave side.

Furthermore, even in the fibre channel switch on the slave side, although the abnormal Ethernet communication is detected, the report does not reach the fibre channel switch on the master side due to the abnormal fibre channel communication.

Since no designation is transmitted from the fibre channel switch on the master side, the abnormal state coping unit 48 of the fibre channel switch on the slave side causes the Ethernet monitor unit 54 to determine whether the Ethernet line on its own apparatus side is normal to detect that the Ethernet line is abnormal.

The abnormal state coping unit 48 of the fibre channel switch on the slave side executes a closing process which closes an access between the host computer 31 and the RAID storage apparatus 32.

In exemplary pattern 5, the Ethernet monitor unit 54 of the fibre channel switch on the master side determines that the Ethernet line on its own apparatus side is abnormal.

The abnormal state coping unit 48 of the fibre channel switch on the master side causes the fibre channel communication unit 44 to transmit a state transmission command which instructs the fibre channel switch to notify of the state of the Ethernet line to the fibre channel switch on the slave side.

The fibre channel switch on the slave side receives the state transmission command.

The Ethernet monitor unit 54 of the fibre channel switch on the slave side determines that the Ethernet line on its own apparatus side is normal. The abnormal state coping unit 48 of the fibre channel switch on the slave side causes the fibre channel communication unit 44 to transmit a monitor result command, representing that the Ethernet line on the slave side is normal, to the fibre channel switch on the master side.

The fibre channel switch on the master side receives a monitor result command representing that the Ethernet line on the slave side is normal.

The abnormal state coping unit 48 of the fibre channel switch on the master side causes the fibre channel communication unit 44 to transmit a failover process command which causes the fibre channel switch on the slave side to perform a failover process. The abnormal state coping unit 48 of the fibre channel switch on the master side executes a closing process which closes an access between the host computer 31 and the RAID storage apparatus 32 because the Ethernet line on its own apparatus side is abnormal.

On the other hand, the abnormal state coping unit 48 of the fibre channel switch on the slave side which receives the failover process command executes a failover process which one-sides the process of the fibre channel switch on the master side.

In exemplary pattern 6, the Ethernet monitor unit 54 of the fibre channel switch on the master side determines that the Ethernet line on its own apparatus side is abnormal.

The abnormal state coping unit 48 of the fibre channel switch on the master side causes the fibre channel communication unit 44 to transmit a state transmission command which instructs the fibre channel switch to notify of the state of the Ethernet line to the fibre channel switch on the slave side.

The fibre channel switch on the slave side receives the state transmission command.

The Ethernet monitor unit 54 of the fibre channel switch on the slave side determines that the Ethernet line on its own apparatus side is abnormal. The abnormal state coping unit 48 of the fibre channel switch on the slave side causes the fibre channel communication unit 44 to transmit a monitor result command, representing that the Ethernet line on the slave side is abnormal, to the fibre channel switch on the slave side.

The fibre channel switch on the master side receives a monitor result command representing that the Ethernet line on the slave side is abnormal.

The abnormal state coping unit 48 of the fibre channel switch on the master side causes the fibre channel communication unit 44 to transmit a closing process command which closes the fibre channel switch on the slave side. Although the Ethernet line on its own apparatus side is abnormal, the abnormal state coping unit 48 of the fibre channel switch on the master side executes a failover process which one-sides the process of the fibre channel switch on the slave side.

On the other hand, the abnormal state coping unit 48 of the fibre channel switch on the slave side which receives the closing process command executes a closing process which closes an access between the host computer 31 and the RAID storage apparatus 32.

In exemplary pattern 7, the Ethernet monitor unit 54 of the fibre channel switch on the master side determines that the Ethernet line on its own apparatus side is abnormal.

The abnormal state coping unit 48 of the fibre channel switch on the master side causes the fibre channel communication unit 44 to transmit a state transmission command which instructs the fibre channel switch to notify of the state of the Ethernet line to the fibre channel switch on the slave side.

However, due to the abnormal fibre channel communication, the state transmission command does not reach the fibre channel switch on the slave side to fail in communication.

The abnormal state coping unit 48 of the fibre channel switch on the master side, although the state of the Ethernet line on the slave side is unknown, since the Ethernet line on its own apparatus side is abnormal, executes a closing process which closes an access between the host computer 31 and the RAID storage apparatus 32.

In this exemplary pattern, since abnormality occurs in the fibre channel communication, a state designation command does not reach the fibre channel switch on the slave side. However, even in the fibre channel switch on the slave side, the abnormal Ethernet communication is detected, and the report does not reach the fibre channel switch on the master side due to the abnormal fibre channel communication.

Since no designation is transmitted from the fibre channel switch on the master side, the abnormal state coping unit 48 of the fibre channel switch on the slave side causes the Ethernet monitor unit 54 to determine whether the Ethernet line on its own apparatus side is normal to detect that the Ethernet line is normal.

The abnormal state coping unit 48 of the fibre channel switch executes a failover process which one-sides the process of the fibre channel switch on the master side.

In exemplary pattern 87 the Ethernet monitor unit 54 of the fibre channel switch on the master side determines that the Ethernet line on its own apparatus side is abnormal.

The abnormal state coping unit 48 of the fibre channel switch on the master side causes the fibre channel communication unit 44 to transmit a state transmission command which instructs the fibre channel switch to notify of the state of the Ethernet line to the fibre channel switch on the slave side.

However, due to the abnormal fibre channel communication, the state transmission command does not reach the fibre channel switch on the slave side to fail in communication.

The abnormal state coping unit 48 of the fibre channel switch on the master side, although the state of the Ethernet line on the slave side is unknown, since the Ethernet line on its own apparatus side is abnormal, executes a closing process which closes an access between the host computer 31 and the RAID storage apparatus 32.

In this exemplary pattern, since abnormality occurs in the fibre channel communication, a state designation command does not reach the fibre channel switch on the slave side. However, even in the fibre channel switch on the slave side, the abnormal Ethernet communication is detected, and the report does not reach the fibre channel switch on the master side due to the abnormal fibre channel communication.

Since no designation is transmitted from the fibre channel switch on the master side, the abnormal state coping unit 48 of the fibre channel switch on the slave side causes the Ethernet monitor unit 54 to determine whether the Ethernet line on its own apparatus side is normal to detect that the Ethernet line is abnormal.

The abnormal state coping unit 48 of the fibre channel switch on the slave side executes a closing process which close an access between the host computer 31 and the RAID storage apparatus 32.

In case of the exemplary pattern 8 described above, since both the fibre channel switches execute the closing processes, a system-down state is set. However, since a split brain state is not set, garbled data can be prevented from being transmitted.

Based on the exemplary pattern described above, an operation executed by the fibre channel switch on the master side will be described with reference to the flow chart in FIG. 4. A circled number in the flow chart corresponds to the number of each of the operations described above.

The Ethernet monitor unit 54 transmits the dummy information as described above to always monitor whether abnormality occurs in Ethernet communication (operation S100).

When an abnormal Ethernet communication is detected, or when the fibre channel switch on the slave side reports that the Ethernet communication is abnormal (operation S102), the Ethernet monitor unit 54 detects whether the abnormality is the one in the Ethernet line on its own apparatus side (operation S104).

When the Ethernet monitor unit 54 determines that the Ethernet line on its own apparatus side is normal, the abnormal state coping unit 48 outputs a closing process command to the fibre channel switch on the slave side (operation S120).

The abnormal state coping unit 48 executes a failover process which one-sides the process of the fibre channel switch on the slave side (operation S122). This flow corresponds to the exemplary patterns (1) to (4) described above.

in operation S104, when the Ethernet monitor unit 54 determines that the Ethernet line on its own apparatus side is abnormal, the abnormal state coping unit 48 acquires a state of the Ethernet line in the fibre channel switch on the slave side (operation S106). This flow corresponds to the exemplary patterns (5) to (8) described above.

When the state on the slave side cannot be acquired, the abnormal state coping unit 48 determines that the fibre channel communication is abnormal (operation S109). In this case, although the state on the slave side cannot be recognized on the master side, since the Ethernet line itself on the master side is abnormal, the abnormal state coping unit 48 on the master side executes a closing process which closes an access between the host computer 31 and the RAID storage apparatus 32 (operation S111). This flow corresponds to the exemplary patterns (7) and (8) described above.

In operation S108, when the state on the slave side can be acquired, different processes are performed depending on whether the Ethernet line on the slave side is normal or abnormal (operation S110).

When the Ethernet line on the slave side is normal, the abnormal state coping unit 48 outputs a failover process command to the fibre channel switch on the slave side (operation S113). The abnormal state coping unit 48 executes a closing process which closes an access between the host computer 31 and the RAID storage apparatus 32 (operation S115). This flow corresponds to the exemplary pattern (5) described above.

In operation S110, when the Ethernet line on the slave side is abnormal, the abnormal state coping unit 48 outputs a closing process command to the fibre channel switch on the slave side (operation S112). The abnormal state coping unit 48 one-sides the process of the fibre channel switch on the slave side to execute a failover process (operation S114). This flow corresponds to the exemplary pattern (6) described above.

Based on the exemplary pattern described above, an operation executed by the fibre channel switch on the slave side will be described with reference to the flow chart in FIG. 5. A circled number in the flow chart corresponds to the number of each of the operations described above.

The Ethernet monitor unit 54 of the fibre channel switch on the slave side transmits the dummy information as described above to always monitor whether abnormality occurs in Ethernet communication (operation S200).

When an abnormal Ethernet communication is detected (operation S202), the Ethernet monitor unit 54 causes the fibre channel communication unit 44 to report the abnormal Ethernet communication to the fibre channel switch on the master side (operation S204).

When there is a response from the fibre channel switch on the master side to the report of the abnormal communication in operation S206, the abnormal state coping unit 48 performs a process based on a designation command from the master side.

As a designation from the fibre channel switch on the master side to the slave side, any one of the closing process or the failover process is performed. The abnormal state coping unit 48 executes the closing process or the failover process based on any one of the received commands (operation S207). This flow corresponds to the exemplary patterns (5) and (6) described above.

When there is no response from the fibre channel switch on the master side to the report of the abnormal communication after a predetermined period of time is elapsed in operation S206, the Ethernet monitor unit 54 detects whether the abnormality is the one in the Ethernet line on its own apparatus side (operation S208).

When the Ethernet line on its own apparatus side is not abnormal, the abnormal state coping unit 48 one-sides the process of the fibre channel switch on the master side to execute a failover process (operation S211). This flow corresponds to the exemplary patterns (3) and (7) described above.

In operation S208, when the Ethernet monitor unit 54 detects that the Ethernet line on its own apparatus side is abnormal, the abnormal state coping unit 48 executes a closing process which closes an access between the host computer 31 and the RAID storage apparatus 32 (operation S210). This flow corresponds to the exemplary patterns (4) and (8) described above.

When the abnormal state coping unit 48 of the fibre channel switch on the slave side receives a closing process command from the master side independently of the above flow (operation S220), the abnormal state coping unit 48 executes a closing process which closes an access between the host computer 31 and the RAID storage apparatus 32 (operation S222). This flow corresponds to the exemplary patterns (1) and (2) described above.

In the exemplary embodiment, the master-slave setting unit 50 employs the configuration in which master-slave information representing a master-slave relationship is stored in a nonvolatile memory in advance. However, the present invention is not limited to the exemplary embodiment. For example, the master-slave setting unit 50 may be configured such that, when one fibre channel switch cannot communicate with another fibre channel switch through Ethernet communication unit 13a and 13b, the fibre channel switch communicates with the other fibre channel switch through fibre channel communication unit 26 to determine and set the master-slave relationship between the fibre channel switches.

Furthermore, the embodiment described above explains the case in which Ethernet may be employed as a standard of LAN communication. However, the LAN communication of is not limited to the Ethernet, and an FDDI (Fibre-Distributed Data Interface) or a token ring may be employed.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A virtualization switch comprising:
   a plurality of first communication line connection terminals which can be connected to a host computer, a single physical storage apparatus or a plurality of physical storage apparatuses, and another virtualization switch by first communication lines;
   a second communication line connection terminal which can be connected to a single line concentrator or a plurality of line concentrators connected to a manager computer by a second communication line; and
   storage virtualization unit which causes the host computer to recognize a storage area obtained by combining some or all of storage areas of the single physical storage apparatus or the plurality of physical storage apparatuses as a virtual storage apparatus, the virtualization switch further comprising:
   first communication unit which can communicate with the other virtualization switch through the first communication line;
   second communication unit which can communicate with the other virtualization switch through the second communication line and the line concentrator;
   second communication line monitor unit which periodically performs test communication to check whether communication with the other virtualization switch can be performed by the second communication unit and which detects whether the second communication line on its own apparatus side between the virtualization switch and the line concentrator is abnormal when abnormal communication is detected during the test communication; and
   abnormal state coping unit which operates when the second communication line monitor unit detects the abnormal communication, wherein
   when the second communication line monitor unit detects abnormal communication with the other virtualization switch and detects that the abnormality is abnormality of the second communication line on its own apparatus side, the abnormal state coping unit executes a closing process which closes an access between the host computer and the physical storage apparatus through the virtualization switch and causes the first communication unit to output a failover designation instruction which causes the other virtualization switch to execute a failover process, and
   when the second communication line monitor unit detects abnormal communication with the other virtualization switch and detects that communication of the second communication line on its own apparatus side is normal, the abnormal state coping unit executes the failover process and causes the first communication unit to output a closing designation instruction which executes a closing process for closing an access between the host computer and the physical storage apparatus through the other virtualization switch.

2. The virtualization switch according to claim 1, wherein when the second communication line monitor unit detects abnormal communication with the other virtualization switch and detects that the abnormality is abnormality of the second communication line on its own apparatus side, the abnormal state coping unit causes the first communication unit to output an other-apparatus-side-state acquiring instruction which acquires a state of a second communication line on another apparatus side to the other virtualization switch.

3. The virtualization switch according to claim 1, further comprising:
   master-slave setting unit which can set a master-slave relationship between the virtualization switch and the other virtualization switch, wherein
   only when the virtualization switch is set to be master by the master-slave setting unit, the abnormal state coping unit causes the first communication unit to output the failover designation instruction or the closing designation instruction, and
   when the virtualization switch is set to be slave by the master-slave setting unit, the abnormal state coping unit executes the failover process or the closing process based on a designation of a designation instruction received by the first communication unit.

4. The virtualization switch according to claim 1, further comprising:
 first communication line abnormality detection unit which detects the presence/absence of abnormality of communication with the other virtualization switch by the first communication unit, wherein
 when abnormal communication with the other virtualization switch is detected by the second communication line monitor unit and when the first communication line abnormality detection unit detects abnormal communication with the other virtualization switch due to the first communication line, the abnormal state coping unit executes a failover process or a closing process based on a state of the second communication line on its own apparatus side of the virtualization switch regardless of the presence/absence of reception of the failover designation instruction or the closing designation instruction.

5. The virtualization switch according to claim 1, wherein the first communication line is a fibre channel, the second communication line is a LAN communication line, and the line concentrator is a hub.

6. A method of controlling a virtualization switch which includes: a plurality of first communication line connection terminals which can be connected to a host computer, a single physical storage apparatus or a plurality of physical storage apparatuses, and another virtualization switch by first communication lines; a second communication line connection terminal which can be connected to a single line concentrator or a plurality of line concentrators connected to a manager computer by a second communication line; and storage virtualization unit which causes the host computer to recognize a storage area obtained by combining some or all of storage areas of the single physical storage apparatus or the plurality of physical storage apparatuses as a virtual storage apparatus, the method comprising:
 a second communication line monitoring of periodically performing test communication to check whether communication with the other virtualization switch can be performed through the second communication line and detecting whether the second communication line on its own apparatus side between the virtualization switch and the line concentrator is abnormal when abnormal communication is detected during the test communication; and
 a abnormal state coping operated when the second communication line monitoring detects the abnormal communication, wherein
 when the second communication line monitoring detects abnormal communication with the other virtualization switch and detects that the abnormality is abnormality of the second communication line on its own apparatus side, the abnormal state coping executes a closing process which closes an access between the host computer and the physical storage apparatus through the virtualization switch and outputs a failover designation instruction which causes the other virtualization switch to execute a failover process through the first communication line, and
 when the second communication line monitoring detects abnormal communication with the other virtualization switch and detects that communication of the second communication line on its own apparatus side is normal, the abnormal state coping executes the failover process and outputs, through the first communication line, a closing designation instruction which executes a closing process for closing an access between the host computer and the physical storage apparatus through the other virtualization switch.

7. The virtualization switch according to claim, wherein
 when the second communication line monitoring detects abnormal communication with the other virtualization switch and detects that the abnormality is abnormality of the second communication line on its own apparatus side, the abnormal state coping outputs an other-apparatus-side-state acquiring instruction which acquires a state of a second communication line on another apparatus side to the other virtualization switch through the first communication line.

8. The virtualization switch according to claim 6, further comprising:
 a master-slave setting that can set a master-slave relationship between the virtualization switch and the other virtualization switch, wherein
 only when the virtualization switch is set to be master by the master-slave setting, the abnormal state coping outputs the failover designation instruction or the closing designation instruction through the first communication line, and
 when the virtualization switch is set to be slave by the master-slave setting, the failover process or the closing process is performed based on a designation of a designation instruction received through the first communication line.

9. The virtualization switch according to claim, further comprising:
 a first communication line abnormality detecting the presence/absence of abnormality of communication with the other virtualization switch through the first communication line, wherein
 when abnormal communication with the other virtualization switch is detected by the second communication line monitoring and when the first communication line abnormality detecting detects abnormal communication with the other virtualization switch due to the first communication line, the abnormal state coping executes a failover process or a closing process based on a state of the second communication line on its own apparatus side of the virtualization switch regardless of the presence/absence of reception of the failover designation instruction or the closing designation instruction.

10. The virtualization switch according to claim 6, wherein the first communication line is a fibre channel, the second communication line is a LAN communication line, and the line concentrator is a hub.

* * * * *

UNITED STATES PATENT AND TRADEMARK OFFICE
CERTIFICATE OF CORRECTION

PATENT NO. : 7,801,026 B2
APPLICATION NO. : 12/260430
DATED : September 21, 2010
INVENTOR(S) : Yusuke Kurasawa et al.

It is certified that error appears in the above-identified patent and that said Letters Patent is hereby corrected as shown below:

Column 16, Line 11 in Claim 7, delete "claim," and insert --claim 6,--, therefor.

Column 16, Line 36 in Claim 9, delete "claim," and insert --claim 6,--, therefor.

Signed and Sealed this
Fourth Day of January, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,801,026 B2 | |
| APPLICATION NO. | : 12/260430 | |
| DATED | : September 21, 2010 | |
| INVENTOR(S) | : Yusuke Kurasawa et al. | |

It is certified that error appears in the above-identified patent and that said Letters Patent is hereby corrected as shown below:

Abstract
First Page, Column 2, Line 12 delete "an" and insert --a--, therefor.

Signed and Sealed this
First Day of March, 2011

David J. Kappos
*Director of the United States Patent and Trademark Office*